US009188033B2

(12) United States Patent
Markoski et al.

(10) Patent No.: US 9,188,033 B2
(45) Date of Patent: Nov. 17, 2015

(54) FLEXIBLE FUEL GENERATOR AND METHODS OF USE THEREOF

(71) Applicant: INI POWER SYSTEMS, INC., Morrisville, NC (US)

(72) Inventors: Larry J. Markoski, Raleigh, NC (US); Timothy C. Simmons, Durham, NC (US); Mack L. Nance, Raleigh, NC (US)

(73) Assignee: INI Power Systems, Inc., Morrisville, NC (US)

( * ) Notice: Subject to any disclaimer, the term of this patent is extended or adjusted under 35 U.S.C. 154(b) by 0 days.

(21) Appl. No.: 14/370,374

(22) PCT Filed: Dec. 20, 2012

(86) PCT No.: PCT/US2012/071042
§ 371 (c)(1),
(2) Date: Jul. 2, 2014

(87) PCT Pub. No.: WO2013/103542
PCT Pub. Date: Jul. 11, 2013

(65) Prior Publication Data
US 2015/0034025 A1 Feb. 5, 2015

Related U.S. Application Data

(63) Continuation-in-part of application No. 13/343,597, filed on Jan. 4, 2012.

(51) Int. Cl.
*F01N 3/00* (2006.01)
*F01N 3/10* (2006.01)
(Continued)

(52) U.S. Cl.
CPC ............... *F01N 3/005* (2013.01); *F01N 3/103* (2013.01); *F01N 5/02* (2013.01); *F02B 5/00* (2013.01);
(Continued)

(58) Field of Classification Search
CPC .... F02B 63/048; F02B 69/02; F02D 19/0649; F02D 41/0025; Y02T 10/36
USPC ............. 123/2, 3, 41.04–41.05, 41.56–41.62, 123/41.67, 41.7, 304, 575, 576, 179.7, 123/179.8
See application file for complete search history.

(56) References Cited

U.S. PATENT DOCUMENTS

| D10,647 | S | 4/1878 | Kimberly |
| 1,467,620 | A * | 9/1923 | Lindsey ........................ 123/583 |

(Continued)

FOREIGN PATENT DOCUMENTS

| CA | 2865806 | 11/2014 |
| CA | 2860584 | 12/2014 |

(Continued)

OTHER PUBLICATIONS

141212 Yamaha EF1000is Owners Manual 2004 LIT-19626-01-19.pdf.*

(Continued)

*Primary Examiner* — Erick Solis
*Assistant Examiner* — Carl Staubach
(74) *Attorney, Agent, or Firm* — Evan Law Group LLC

(57) ABSTRACT

A portable flexible fuel generator, having an engine, includes: a cylinder and a spark plug in the cylinder, a primary fuel tank fluidly connected to the cylinder, an air intake path fluidly connecting atmosphere to the cylinder, a start module including a starting fuel tank holder and a starting fuel line, where the starting fuel line is fluidly connected to the air intake path, a coolant path which provide a flow path for coolant to cool the cylinder, and a thermal controller along the coolant path. Furthermore, the engine has full cylinder cooling.

31 Claims, 7 Drawing Sheets

(51) Int. Cl.
  *F01N 5/02* (2006.01)
  *F02B 5/00* (2006.01)
  *F02B 63/04* (2006.01)
  *F02B 69/02* (2006.01)
  *F02D 19/06* (2006.01)
  *F02B 9/04* (2006.01)

(52) U.S. Cl.
  CPC .............. *F02B 63/042* (2013.01); *F02B 63/048* (2013.01); *F02B 69/02* (2013.01); *F02D 19/0615* (2013.01); *F02D 19/0649* (2013.01); *F01N 2590/06* (2013.01); *F02B 9/04* (2013.01); *Y02T 10/16* (2013.01); *Y02T 10/20* (2013.01); *Y02T 10/36* (2013.01)

(56) References Cited

U.S. PATENT DOCUMENTS

| | | | |
|---|---|---|---|
| 1,573,641 A * | 2/1926 | Hunt | 123/41.04 |
| 1,792,785 A * | 2/1931 | Upton et al. | 123/41.07 |
| 1,835,490 A * | 12/1931 | Hesselman | 123/263 |
| 2,211,690 A | 8/1940 | Edwards | |
| 2,503,490 A | 4/1950 | Robert | |
| 2,520,226 A | 8/1950 | Smith | |
| 2,986,135 A * | 5/1961 | Clark et al. | 123/179.7 |
| 2,995,127 A * | 8/1961 | Orr | 123/179.8 |
| 3,593,023 A | 7/1971 | Dodson et al. | |
| 3,760,781 A * | 9/1973 | Boldt | 123/630 |
| 3,966,330 A | 6/1976 | Ridler et al. | |
| 4,109,193 A | 8/1978 | Schultheis | |
| 4,221,206 A | 9/1980 | Haas | |
| 4,374,508 A * | 2/1983 | Pena | 123/25 E |
| 4,386,938 A | 6/1983 | Earle | |
| 4,433,548 A | 2/1984 | Hallstrom, Jr. | |
| 4,489,680 A * | 12/1984 | Spokas et al. | 123/41.05 |
| 4,508,071 A * | 4/1985 | Drenner | 123/198 A |
| 4,548,164 A * | 10/1985 | Ylonen et al. | 123/2 |
| D289,033 S | 3/1987 | Makinson et al. | |
| 4,936,280 A * | 6/1990 | Langlois | 123/578 |
| 4,968,941 A | 11/1990 | Rogers | |
| 5,090,967 A | 2/1992 | Lindström | |
| 5,162,662 A | 11/1992 | Nakayama | |
| 5,199,397 A | 4/1993 | Shelef et al. | |
| D340,565 S | 10/1993 | Klopfenstein | |
| 5,444,378 A | 8/1995 | Rogers | |
| 5,447,308 A | 9/1995 | Girard | |
| 5,458,350 A | 10/1995 | Johnson et al. | |
| 5,555,853 A * | 9/1996 | Bowen et al. | 123/2 |
| 5,566,745 A * | 10/1996 | Hill et al. | 165/299 |
| D379,640 S | 6/1997 | Gilbert | |
| 5,794,601 A | 8/1998 | Pantone | |
| D417,651 S | 12/1999 | Ohsumi | |
| D420,465 S | 2/2000 | Cascio | |
| 6,100,599 A | 8/2000 | Kouchi et al. | |
| 6,112,635 A | 9/2000 | Cohen | |
| D437,825 S | 2/2001 | Imai | |
| 6,564,556 B2 | 5/2003 | Ginter | |
| 6,581,375 B2 | 6/2003 | Jagtoyen et al. | |
| D477,569 S | 7/2003 | Iwatate et al. | |
| 6,739,289 B2 | 5/2004 | Hiltner et al. | |
| D518,771 S | 4/2006 | Xiao | |
| D520,948 S | 5/2006 | Xiao | |
| 7,049,707 B2 | 5/2006 | Wurtele | |
| D532,748 S | 11/2006 | Disbennett et al. | |
| 7,161,253 B2 | 1/2007 | Sodemann et al. | |
| 7,183,746 B1 | 2/2007 | Carter | |
| 7,302,795 B2 | 12/2007 | Vetrovec | |
| D594,819 S | 6/2009 | Yamamoto et al. | |
| D597,485 S | 8/2009 | Ma | |
| 7,690,336 B2 | 4/2010 | Bowman et al. | |
| 7,695,049 B2 | 4/2010 | Colborne | |
| 7,765,794 B2 | 8/2010 | Alexander | |
| 7,849,680 B2 | 12/2010 | Shaff et al. | |
| 7,893,658 B2 | 2/2011 | Bhardwaj | |
| D633,443 S | 3/2011 | Wang et al. | |
| 8,061,121 B2 | 11/2011 | Haugen | |
| D650,739 S | 12/2011 | Cai | |
| 8,100,093 B2 | 1/2012 | Morgenstern | |
| D662,881 S | 7/2012 | He et al. | |
| 8,567,354 B2 | 10/2013 | Kealy et al. | |
| 8,601,772 B2 | 12/2013 | Turpin et al. | |
| 8,698,451 B2 | 4/2014 | King et al. | |
| D733,052 S | 6/2015 | Markoski et al. | |
| 2001/0047777 A1* | 12/2001 | Allen | 123/73 C |
| 2002/0148221 A1 | 10/2002 | Jagtoyen et al. | |
| 2004/0004356 A1 | 1/2004 | Akimoto et al. | |
| 2004/0221828 A1 | 11/2004 | Ries-Mueller et al. | |
| 2010/0019729 A1 | 1/2010 | Kaita et al. | |
| 2010/0201328 A1 | 8/2010 | Monsive, Jr. | |
| 2011/0114068 A1 | 5/2011 | Habing et al. | |
| 2011/0168128 A1 | 7/2011 | Bradley et al. | |
| 2012/0012574 A1 | 1/2012 | Vandrak et al. | |
| 2012/0291420 A1* | 11/2012 | Kim et al. | 60/274 |
| 2013/0131966 A1 | 5/2013 | Hirano | |
| 2013/0152898 A1* | 6/2013 | Ki et al. | 123/406.12 |
| 2013/0158837 A1* | 6/2013 | Jung et al. | 701/103 |
| 2013/0168969 A1 | 7/2013 | Markoski | |
| 2013/0221684 A1 | 8/2013 | Markoski | |
| 2015/0014998 A1 | 1/2015 | Markoski | |
| 2015/0034025 A1 | 2/2015 | Markoski et al. | |

FOREIGN PATENT DOCUMENTS

| | | |
|---|---|---|
| CN | 200952429 Y | 9/2007 |
| CN | 102104280 | 6/2011 |
| CN | 20133043893 | 2/2014 |
| DE | 10 2009 052 571 A1 | 5/2011 |
| EP | 1 069 295 A2 | 1/2001 |
| EP | 1 383 224 A1 | 1/2004 |
| EP | 1 505 709 A2 | 2/2005 |
| FR | 2 815 486 | 4/2002 |
| FR | 2 959 888 A1 | 11/2011 |
| FR | 2 962 002 A1 | 12/2011 |
| GB | 2 184075 A | 6/1987 |
| GB | 1302360 | 3/2013 |
| GB | 1302360 | 8/2013 |
| GB | 1302360 | 1/2014 |
| IL | 233473 | 1/2015 |
| IN | 256526 | 12/2013 |
| JP | 64-32060 | 2/1989 |
| JP | 2010-236301 | 9/1998 |
| JP | 11-190220 | 7/1999 |
| JP | 2001-27128 | 1/2001 |
| JP | 2003-219573 | 7/2003 |
| JP | 2003-293771 | 10/2003 |
| JP | 2003-293788 | 10/2003 |
| JP | 2004-245219 | 9/2004 |
| JP | 2006-188980 | 7/2006 |
| JP | 2008-54442 | 3/2008 |
| JP | 2008-255831 | 10/2008 |
| JP | 2010-20906 | 1/2010 |
| JP | 2010-158129 | 7/2010 |
| JP | 2011-120346 | 6/2011 |
| JP | 2011-252407 | 12/2011 |
| JP | 2012-7508 | 1/2012 |
| JP | 2012-23825 | 2/2012 |
| JP | 2012-34488 | 2/2012 |
| JP | 2010-279107 | 12/2012 |
| JP | 2014-551271 | 2/2015 |
| JP | 2014-559960 | 3/2015 |
| WO | WO 95/26464 | 10/1995 |
| WO | WO 2011/015731 A1 | 2/2011 |
| WO | WO 2012/005021 | 1/2012 |
| WO | WO 2012/011568 | 1/2012 |
| WO | PCT/US2012/070849 | 3/2013 |
| WO | PCT/US2012/071042 | 6/2013 |
| WO | WO 2013/103532 A1 | 7/2013 |
| WO | WO 2013/103542 A2 | 7/2013 |
| WO | WO 2013/130533 | 9/2013 |
| WO | PCT/US13/27922 | 11/2013 |
| WO | PCT/US13/27922 | 1/2014 |
| WO | PCT/US2012/070849 | 7/2014 |
| WO | PCT/US2012/071042 | 8/2014 |
| WO | PCT/US13/27922 | 9/2014 |

(56) References Cited

FOREIGN PATENT DOCUMENTS

OTHER PUBLICATIONS

Honda Owner's Manual Generator EU1000i, 92 pages, (2008).
Options for Generators and Welders, located at www.hondapowerequipment.com/pdf/Accessories/ml.repap44a.generators.pdf, 15 pages, downloaded Oct. 1, 2011.
Yamaha Inverter EF2000iS Specifications, located at www.yamaha-motor.com/outdoor/products/modelspecs__pdf.aspx?Is=outdoor&mid=626&showprevmodel=0, 1 page, downloaded Oct. 2011.
Yamaha Inverter EF1000iS Specifications, located at www.yamaha-motor.com/outdoor/products/modelspecs__pdf.aspx?Is=outdoor&mid=442&showprevmodel=0, 1 page, downloaded Oct. 2011.
Specification of Honda EU1000i, located at www.hondapowerequipment.com/products/modeldetail.aspx?page=modeldetail&section=P2GG&modelname=EU1000i&modelid=EU1000IKN, 1 page, downloaded Oct. 1, 2011.
Specification of Honda EU2000i, located at www.hondapowerequipment.com/products/modeldetail.aspx?page=modeldetail&section=P2GG&modelname=EU2000i&modelid=EU2000IKN, 1 page, downloaded Oct. 1, 2011.
Honda Power Equipment Decibels chart, located at www.hondapowerequipment.com/images/dbchart.jpg., 1 page, downloaded Oct. 1, 2011.
"Gasoline", Wikipedia, pp. 1-13, found at http://en.wikipedia.org/wiki/gasoline, printed on Dec. 4, 2012.
"Petrol-paraffin engine", Wikipedia, pp. 1-2, found at http://en.wikipedia.org/wiki/petrol-paraffin_engine, printed on Dec. 3, 2012.
United Kingdom Search and Examination Report dated Mar. 27, 2013 for GB application No. GB1302360.1, 10 pages.
Yamaha Generator Owners Manual EF1000iS, 41 pages, 2004.
25 pages, U.S. Appl. No. 29/449,784, filed Dec. 15, 2014.
International Search Report dated Mar. 15, 2013 for PCT application No. PCT/US/2012/070849.
Translation of Japanese Office Action dated Feb. 12, 2015.
Translation of Japanese Office Action dated Mar. 2, 2015.
13 pages, U.S. Appl. No. 29/449,784, filed Mar. 9, 2015.
U.S. Appl. No. 29/527,360, filed May 18, 2015.
5 pages, U.S. Appl. No. 13/343,597, filed Sep. 12, 2013.
19 pages, U.S. Appl. No. 13/343,597, filed Jan. 15, 2014.
14 pages, U.S. Appl. No. 13/408,903, filed Jan. 6, 2014.
3 pages, U.S. Appl. No. 13/408,903, filed Feb. 28, 2014.
20 pages, U.S. Appl. No. 13/408,903, filed Apr. 16, 2014.
15 pages, U.S. Appl. No. 13/343,597, filed Sep. 30, 2014.
U.S. Appl. No. 13/343,597, filed Jan. 4, 2012.
U.S. Appl. No. 29/449,784, filed Mar. 15, 2013.
U.S. Appl. No. 14/336,361, filed Jul. 21, 2014.
U.S. Appl. No. 14/493,168, filed Sep. 22, 2014.

\* cited by examiner

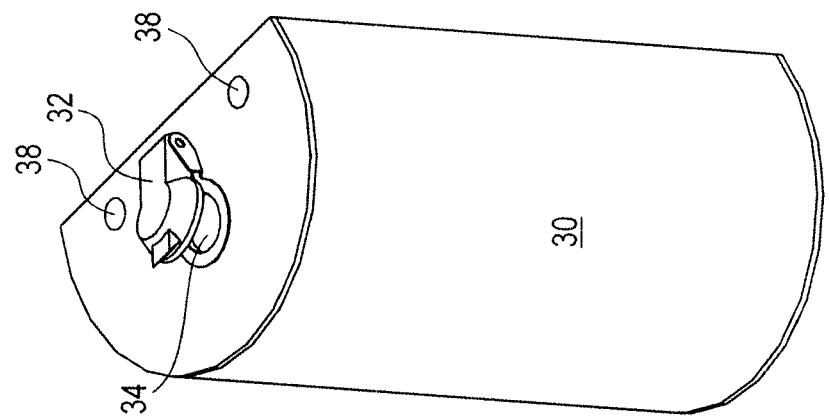
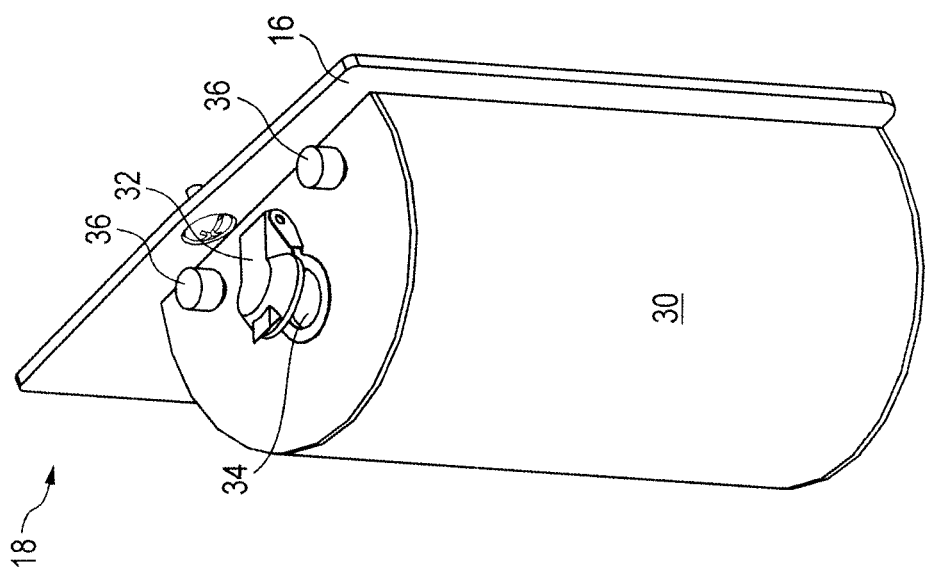
FIG. 4
FIG. 3

FLEXIBLE FUEL GENERATOR AND METHODS OF USE THEREOF

CROSS REFERENCE TO RELATED APPLICATION

This application is the national stage of International Application no. PCT/US2012/071042, filed Dec. 20, 2012, and entitled "FLEXIBLE FUEL GENERATOR AND METHODS OF USE THEREOF". PCT/US2012/071042 is a continuation-in-part of U.S. application Ser. No. 13/343,597, filed Jan. 4, 2012, and entitled "FLEX FUEL FIELD GENERATOR".

BACKGROUND

There has been a proliferation of small portable electronic devices in recent years, most of which include onboard and/or detachable rechargeable batteries. Examples include laptop computers, mobile telephones, personal digital assistants, portable digital cameras, global positioning systems, and hand-held radios. The rechargeable batteries are most commonly lithium ion batteries, although other varieties are available. The small portable electronic devices typically include a removable power cord with a standard two-prong or three-prong plug, or a universal serial bus (USB) plug, for plugging into a corresponding plug receiver, which allows for recharging the onboard batteries. Also commonly available are removable power cords with a standard cigarette lighter plug, for recharging the rechargeable batteries using a cigarette lighter plug receiver in an automobile or other vehicle. Also commonly available are multi-bay chargers for multiple electronic devices and/or their detachable batteries with standard two-prong or three-prong power cords. In general these devices typically require less than 1 kW of recharging power whether from AC or DC sources.

For field operation by consumers of portable appliances such as televisions and radios, and small portable electronic devices and recharging of the batteries therein, small portable gasoline-only inverter generators have come into common use. The advantage of using small portable gasoline-only inverter generators is the much lower sound profile, lighter weight, and greater efficiency for generating the small amount of electricity needed to recharge batteries, over the period of time necessary for recharging. Gasoline or petrol for the generator is readily available at retail gasoline refueling stations.

Remote field operations, such as those in areas far away from highways, retail outlets, and the electrical grid, require participants to carry all supplies, especially consumable supplies, which will be needed to complete the operations. Not only is the total amount of supplies often minimized to reduce cost and weight, but the variety of supplies is also minimized, to reduce logistical costs and complexity in transporting materials to, and resupplying, a base camp.

To get to remote field locations, off-road and military tactical vehicles often utilize diesel-type heavy fuels, rather than gasoline or petrol. The supplies carried to such remote field locations typically only include heavy fuel, not gasoline, for the vehicles as is common in the US military with it's one fuel forward policy with a diesel type fuel (JP-8). In these cases, recharging of batteries or batteries within electronic devices is typically carried out using power generated by the vehicle, via idling the vehicle main engine while recharging the batteries or from a large 2-10 kW heavy fuel generators towed or delivered on-site by the vehicle or air support. Furthermore, in these remote and austere field locations, the noise generated by the vehicles idling engine or heavy fuel generator can be especially undesirable and often exceeding 70 dB, considering the extended period of time needed for recharging batteries or devices. Under these circumstances, the use of heavy fuels and a heavy fuel generator or idling vehicle engine is particularly inefficient for recharging small format batteries, due to the poor match between the power generated and the power required and consumed.

Generators for producing electricity are well known and have been commercially available for many years. These devices typically include an internal combustion engine. They are adapted to provide alternating current (AC) electricity, through a standard two-prong or three-prong plug receiver, at 120 or 240 volts, and at 50 to 60 Hz; also common is an additional 12 volt DC power port for charging lead acid batteries. Devices which use either gasoline-only or heavy fuels only, such as JP-8, diesel fuel, jet fuel or kerosene, are available.

Gasoline and heavy fuel engines are products of distinct and divergent technologies. Gasoline has a low-flashpoint (less than −20° C.) and high autoignition temperature (greater than 200° C.). In operation gasoline requires the proper air to fuel ratio and a spark to induce and maintain ignition. A throttle and/or fuel injector is used to meter the fuel/air mixture which is sucked into the cylinders of the engine during operation. The low flashpoint and volatility of gasoline allows starting of the spark ignition engine at temperatures below freezing, allowing for operation over a broad range of temperatures typically between −20° C. to 55° C. In order to obtain acceptable efficiency, a compression ratio of 8:1 to 12:1 is desirable for a gasoline-only engine, which is low enough to allow for manual pull-starting of the engine and the construction of simple lightweight portable engine devices made of aluminum. Improving the combustion efficiency of a gasoline engine by increasing the compression ratio further can result in autoignition ("knocking") problems which interfere with operation and durability of the aluminum engine.

Diesel fuel and kerosene (heavy fuels) have both high flashpoints (greater than 35° C.) and low autoignition temperatures (below 200° C.). A diesel engine relies on compression induced autoignition to ignite the air/fuel mixture. Although a compression ratio of 18:1 or 20:1 is necessary to start and sustain reliable compression ignition, the superior combustion efficiency provides cost and power advantages. Furthermore, the high compression ratio requires that the fuel is sprayed into the cylinders with a pump at 70 to 80 psi, atomizing the fuel to form the liquid fuel/air mixture. The compression ignition engine cannot typically be started at low to moderate temperatures without the input of some form of high pressure from a fuel pump or thermal energy from glow plugs or block heaters. The high compression ratio requires stronger engine block materials and a heavy duty battery to start the engine, making small portable devices unrealistic.

Diesel fuel and kerosene cannot be used directly in a gasoline-only engine using a spark ignition. At ambient temperatures a gasoline-only engine would not start if heavy fuels are used. If somehow the engine were started, incomplete combustion of the heavy fuel quickly floods the engine and fouls the lubricant and spark plug. Unwanted autoignition ("knocking") is also observed.

There exists vehicles that can be operated on both gasoline and diesel fuel. An example is the "duce-and-a-half" or M35 cargo truck. In this hypercycle, multi-fuel engine, a very high compression ratio is used: the very high compression ratio allows for efficient autoignition of both gasoline and diesel fuel. The very high compression ratio requires strong engine block materials and a large engine and for the user to add oil to the gasoline in order to maintain lubrication. Accordingly, this approach cannot be used to create a portable generator.

SUMMARY

A portable flexible fuel generator, having an engine, comprises: (1) a cylinder, and a spark plug in the cylinder, (2) a primary fuel tank, fluidly connected to the cylinder, (3) an air intake path, fluidly connecting atmosphere to the cylinder, (4) a start module, comprising a starting fuel tank holder and a starting fuel line, wherein the starting fuel line is fluidly connected to the air intake path, (5) a coolant path, which provide a flow path for coolant to cool the cylinder, and (6) a thermal controller, along the coolant path. The engine has full cylinder cooling.

A method of generating electricity with a generator, the generator having an engine comprising a cylinder and a spark plug, comprises: operating the engine after start-up in the isothermal range of 120-180° C., and fueling the engine with a running fuel comprising a heavy fuel.

A method of making a portable flexible fuel generator, comprises modifying a portable gasoline generator. The modifying comprises: adding a starting module comprising a starting fuel tank holder and a starting fuel line, wherein the stating fuel line is fluidly connected to an air intake path of the portable gasoline generator; adding a thermal controller, along the coolant path of the portable gasoline generator; and retarding the spark plug ignition timing.

The portable flexible fuel generator may be made by modifying a portable gasoline generator.

DEFINITIONS

Heavy fuels include diesel fuel, diesel 1, diesel 2, kerosene, JP-8, JP-5, F-76, DF2 aviation fuel and bio-diesel. Heavy fuels or gasoline are occasional mixed with a substantial amount of lubricant, such as oil, to form a fuel-lubricant mixture for use in two-stroke engine which do not contain a lubricant. Preferably, Heavy fuels or gasoline is not present as such fuel-lubricant mixtures.

Diesel fuel includes diesel 1, diesel 2, JP-8, JP-5, F-76, DF2 aviation fuel and bio-diesel. Diesel fuel does not include kerosene.

Gaseous low-flashpoint fuels include hydrogen, syn gas, propane and butane.

Low-boiling point low-flashpoint fuels include diethyl ether and gasoline. These fuels have a boiling point of 15-50° C., and a flashpoint below 0° C.

Fuels include heavy fuels with high flash point and low autoignition temperatures, gaseous low-flashpoint fuels, low-boiling point low-flashpoint fuels and other high flash point and high autoignition fuels such as methanol, ethanol and isopropanol. Fuels may contain additives, for example to improve combustion or reduce emissions.

A "portable gasoline generator" is a generator that has an internal combustion engine and includes a pull start and uses a spark to ignite fuel in the engine, and preferably does not include a battery for starting the engine. The compression ratio used in the engine is greater than 8.0:1, and more preferably 8.1:1 to 12.0:1. Preferably, the engine is air-cooled, has an aluminum cylinder or cylinders, and uses fixed spark plug ignition timing. Preferably, the engine is a 4 cycle, 50 cc engine. Examples of a portable gasoline generator include the YAMAHA Inverter EF1000iS and the HONDA EU1000i.

The term "isothermal" or "isothermally" in the context of the operation of an engine means that the temperature of the cylinder(s) at the spark plug is maintained substantially uniform within a desired temperature range, irrespective of engine RPM or ambient external temperature.

A "step-down gas regulator" is a gas regulator that delivers gas at a pressure of 0.5 to 1 psi, only supplies the gas under suction. Examples of such regulators are sold under the brand name "GARRETSON".

The term "engine" means the internal combustion engine of a generator, which includes at least a cylinder, a piston which moves inside the cylinder, a spark plug, a fuel-air inlet to the cylinder, an exhaust outlet from the cylinder, and a drive shaft which moves with the piston. Preferably the engine also contains a lubricant.

The term "running fuel" means a fuel used to run an engine, while the term "starting fuel" means a fuel used to start an engine.

BRIEF DESCRIPTION OF THE DRAWINGS

FIG. 3 illustrates a start module.
FIG. 4 illustrates starting fuel enclosure.

DETAILED DESCRIPTION

Figure 1:
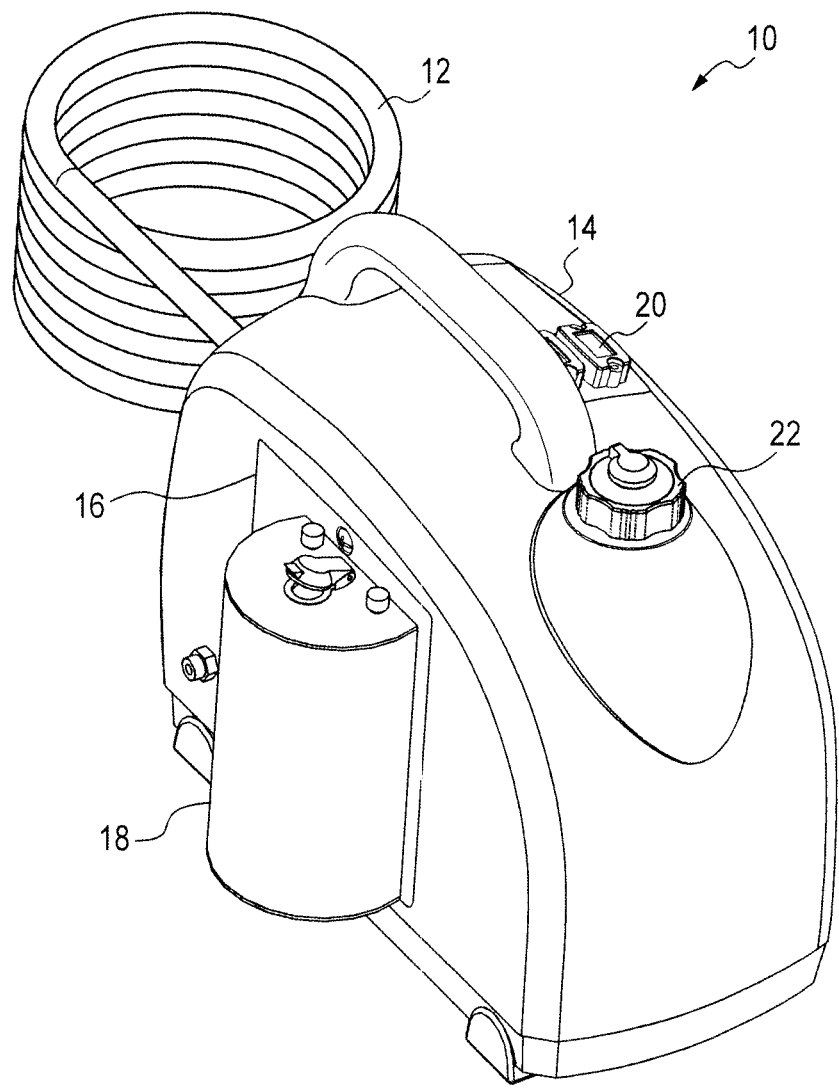
FIGS. 1 and 2 illustrate a flexible fuel generator.

In order to develop a small portable generator which could be operated on heavy fuels, preferably JP-8, it was necessary to investigate in detail the sources of the problems which result from using heavy fuel in a portable gasoline generator: (1) problems starting the engine; (2) fouling of the lubricating oil; and (3) engine knocking. The following were discovered during this investigation.

Problems starting the engine were discovered to result from the low volatility and low flashpoint of heavy fuels compared to gasoline. Although gasoline is a mixture of various hydrocarbons and other flammable liquids (such as ethanol) and additives, and its composition is varied depending on the local weather conditions (such as summer and winter formulations), it typically has an initial boiling point of about 40° C. and a flashpoint of about −40° C. In contrast, heavy fuel, such as JP-8, has a boiling point above 150° C. and a flashpoint of about 40° C. When entering the cylinder of the engine, the gasoline-air mixture will include a large amount of gasoline vapor. The spark from the spark plug ignites this vapor, and the flame front travels through the cylinder to quickly burn all the gasoline. Because of the low flashpoint of heavy fuel, the spark from the spark plug fails to ignite the fuel-air mixture. Even when the heavy fuel is introduced in the engine pre-warmed above the flashpoint of the heavy fuel, the low volatility of the heavy fuel means that most of the heavy fuel is present as large droplets, which incompletely burn or dissolve into the engine oil.

This incompletely burned heavy fuel collects in the engine. The heavy fuel then begins to mix with the lubricant, which quickly accumulates in the crank case. The low volatility of the heavy fuel, exacerbated by the very low volatility of the lubricant, prevents the heavy fuel from fully evaporating. The engine will then begin to smoke and may seize-up due to cylinder flooding.

Knocking is caused by autoignition of the heavy fuels within parts of the cylinder. After ignition by the spark, the burning fuel creates a shock wave which travels through the cylinder and moves the piston downward. The expanding shock wave moves faster than the flame front of the burning fuel. Furthermore, some parts of the cylinder, particularly at the exhaust exit, tend to be much hotter than other parts of the cylinder. When the shock wave reaches the rapidly heating end gas ahead of the flame front, the heavy fuel ignites by autoignition from the increased pressure of the shock wave and the ever-increasing temperature of the end gas, causing destructive engine knocking.

The present invention is based on a variety of discoveries, to address these problems. Together, they allow heavy fuels, in particular diesel fuels such as JP-8 fuel, to be used in a modified gasoline generator, creating a portable flexible fuel generator. The portable flexible fuel generator incorporates the following features: (1) A start module which delivers a small amount of a low-boiling point low-flashpoint fuel to the carburetor via the air intake, for starting the engine; (2) a thermal controller, which adjusts the cooling of the engine so that it operates at a range of 120-180° C.; and (3) full cylinder air cooling, which cools the entire cylinder, so that the temperature of the cylinder(s) is maintained substantially uniform, without hot spot.

It has been discovered that a small amount of a low-boiling point low-flashpoint fuel supplied to the air intake of the generator, will allow starting of the engine with heavy fuels. A small amount of the low-boiling point low-flashpoint fuel, from 0.1 to 10.0 grams, delivered anywhere along the air intake path, will evaporate at an appropriate rate to allow starting and continued operation of the engine with liquid heavy fuel. By the time the low-boiling point low-flashpoint fuel has evaporated and been consumed, the engine has reached an operating temperature sufficient to sustain the combustion of the heavy fuel and to provide the heat necessary to quickly bring the engine to the isothermal range of 120-180° C. and the engine will then continue running using heavy fuel.

It has also been discovered that a spark ignition engine will not accumulate incompletely burned diesel fuel when operated at an isothermal range of 120-180° C. The generator engine of the present application is designed to operate in a "sweet spot"—an engine operating temperature of 120-180° C.—where heavy fuels, such as JP-8 fuel, behave like gasoline. Within this temperature window JP-8 fuel does not autoignite even at a compression ratio of greater than 8:1, but does burn efficiently when ignited by a spark from a spark plug. The temperature of 120-180° C. of the fuel when it enters the cylinder(s) of the engine ensures sufficient volatility to eliminate liquid fuel accumulation, preventing flooding of the engine and fouling of the lubricant. By redesigning the classic small gasoline powered portable engine to run within this temperature window, the generator engine may operate on gasoline, heavy fuel, and other fuels and mixtures.

It has also been discovered that isothermal operation of an engine, so that the temperature of the cylinder(s) is maintained substantially uniform, without hot spot, prevents knocking. It was believed that operating a generator at higher temperatures would increase knocking, because the pressure needed to induce autoignition is reduced at higher temperatures. However, it was discovered that hot spots, which are at a temperature greater than 180° C., are the true causes of autoignition, and therefore more uniform cooling of the cylinder, especially at the exhaust valve and piston head, reduces the unwanted autoignition of the heavy fuel. This may be carried out by cooling the cylinder at the fuel entrance and/or at the exhaust exit.

Figure 6:
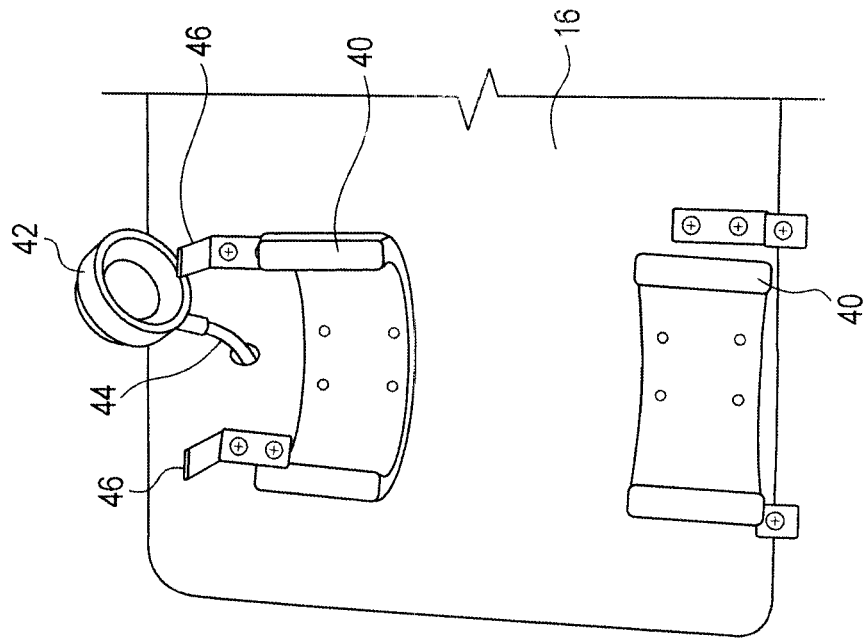
FIGS. 5 and 6 illustrate the interior of a start module, with and without a starting fuel tank, respectively.

The start module includes a starting fuel tank holder and starting fuel line, for fluidly connecting a starting fuel tank to the air intake path. The air intake path fluidly connects the atmosphere outside the generator to the engine, to supply air for combustion of the fuel. Preferably, the start module includes: a starting fuel tank containing low-boiling point low-flashpoint fuel, preferably pressurized, such as a spray can of pressurized diethyl ether commonly available as starting fluid; a starting fuel dispenser, for dispensing the low-boiling point low-flashpoint fuel, such as a spray cap or small mechanical liquid pump; a starting fuel enclosure, having a starting fuel button access for accessing the starting fuel dispenser, a starting fuel button cover to prevent accidental dispensing of the low-boiling point low-flashpoint fuel, enclosure bolt holes for attaching the starting fuel enclosure over the starting fuel tank. When present, the enclosure may be attached to the maintenance panel by bolts. Preferably, the starting fuel tank holder is attached to the generator housing, such as onto the maintenance panel. The starting fuel tank holder may be clips (as illustrated in FIG. 6), an adhesive strip or a strap.

The air intake path is the path along which air enters the generator housing and travels to the carburetor, when the fuel-air mixture is formed and then delivered to the cylinder. Preferably, the generator includes an air filter along the air intake path. The starting fuel line, which may be a simple plastic tube resistant to damage or chemical reaction from the low-boiling point low-flashpoint fuel, preferably delivers the low-boiling point low-flashpoint fuel as a mist to the air exit side (back) of the air filter, or to some other point between the air filter and the carburetor.

The low-boiling point low-flashpoint fuel is preferably diethyl ether, such as starting fluid. Preferably, the low-boiling point low-flashpoint fuel is present in a starting fuel tank, more preferably as a pressurized fluid. Diethyl ether, particularly in the form of starting fluid is especially preferred (for example, VALVOLINE® Extra Strength Starting Fluid with cylinder lubricant), because it is conveniently supplied in pressurized cans of a convenient size; a simple press of the can top for a few seconds will dispense the desired amount of starting fluid mist. Gasoline may also be used, but it is less preferred because the composition and flash point are variable.

An amount of 0.1 to 10.0 grams, more preferably 0.3 to 3.0 grams, including 1.0, 1.5, 2.0 and 2.5 grams, of the low-boiling point low-flashpoint fuel is sufficient to start the engine and sustain the combustion of the heavy fuel. Because the low-boiling point low-flashpoint fuel is provided along the air intake path it will enter the engine as a vapor. The engine will start and run on a combination of any liquid fuel from the primary fuel tank and fuel vapor from the air intake path. As the low-boiling point low-flashpoint fuel evaporates, it will allow the generator to rapidly transition automatically to solely the liquid fuel from the primary fuel tank.

Any heavy fuel, gasoline, or alcohol and mixtures may be used as the liquid fuel from the primary fuel tank. In a variation, the fuel is diesel fuel. Preferably, the heavy fuel is JP-8. It may be desirable to adjust the size of the jet in the generator to compensate for the viscosity of the liquid fuel and the anticipated temperature of the liquid fuel in the primary fuel tank. It may be desirable to retard the spark plug ignition timing, as compared to a gasoline engine, because of the faster flame speed of heavy fuel. The primary fuel tank is fluidly connected to the engine, and delivers liquid fuel to the carburetor.

A thermal controller adjusts the flow of the coolant through the generator. Preferably, the coolant is air. For example, an air fan may pull air through the generator and over the outside of the cylinder, to cool the cylinder, and then out a cooling air outlet. In this configuration, the thermal controller may be a movable sheet of metal or plastic (a thermal door) which can interrupt the amount of the flow of air, at any point along the cooling air path. The thermal controller may be moved to increase or decrease the size of the cooling air outlet. In an alternative configuration, baffles may be use to increase or decrease the size of the cooling air outlet or inlet, or along the cooling air path. In another alternative configuration, the thermal controller may be a fan or pump coupled to a temperature sensor or thermostat, which increases or decreases the coolant flow to maintain the temperature within the desired temperature range.

The thermal controller, such as a thermal door, is used to maintain the temperature of the cylinder at 120-180° C., preferably 130-175° C., more preferably 150-170° C., for example 155-165° C. If the temperature is too low, or too high, the thermal controller can be used to increase or decrease the flow of coolant. The temperature of the generator is preferably the temperature of the cylinder, which may be conveniently measured at the spark plug using a thermocouple temperature sensor (for example, a spark plug temperature sensor available from TRAIL TECH).

In a generator with full cylinder cooling, the isothermal operation of the engine may be maintained. Preferably, the cylinder comprises aluminum (that is, the engine block comprises aluminum), which keeps the generator low in weight, and because of the high thermal conductivity of aluminum, maintains isothermal operation of the engine. Preferably, full cylinder cooling comprises cooling the cylinder at the fuel entrance and/or at the exhaust exit.

Determining if an engine is operating in the isothermal range of 120-180° C. and has full cylinder cooling, may be carried out as follows. The temperature of the engine is measured at the spark plug where it is screwed into the engine block, for example by a thermocouple attached to a washer. The engine is then operated on JP-8 fuel. If the engine does not knock over a period of at least 5 minutes, and the temperature of the engine is maintained at 120-180° C. during that period, then during that time period the engine is operating isothermally at 120-180° C. Furthermore, such operation over the 5 minute period confirms that the engine has full cylinder cooling. In the case of an engine with multiple cylinders, if the temperature at each spark plug must be maintained at 120-180° C. during the 5 minute period, and knocking does not occur, then during that time period the engine is operating isothermally at 120-180° C.; furthermore, such operation over the 5 minute period confirms that the engine has full cylinder cooling. An example of full cylinder cooling is the YAMAHA Inverter EF1000iS, which allows air to cool the cylinder at the fuel entrance and/or at the exhaust exit.

Preferably, the cylinder has a compression ratio greater than 8.0:1, for example 8.1:1 to 12:1 or 10:1, including 8.2:1, 8.3:1, 8.4:1, 8.5:1, 8.6:1, 8.7:1, 8.8:1, 8.9:1, 9.0:1 and 9.5:1. Preferably, the engine is air-cooled, has an aluminum block and uses fixed timing. Preferably, the engine is a 4 cycle, 50 cc engine.

The flexible fuel generator of the present application may be prepared by modifying a portable gasoline generator, such as a YAMAHA Inverter EF1000iS, which is air-cooled, has an aluminum block, uses fixed timing, and is a 4 cycle, 50 cc engine, having a compression ratio of 8.2:1. The figures illustrate such a flexible fuel generator. As illustrated, a start module is added, which deliver the low-boiling point low-flashpoint fuel, such as diethyl ether, to the back of the air filter. A thermal controller is added to the rear of the generator. A temperature display is added, which displays the temperature at the spark plug. The fixed spark plug ignition timing is retarded, by moving the spark ignition coil clockwise from its original position. When a starting fuel tank with starting fuel dispenser is also present, and a heavy fuel such as JP-8 fuel is present in the primary fuel tank, the generator may be started by first depressing the dispenser for 1 to 3 second. The pull start is then used to start the generator, with the thermal door blocking most of the cooling air outlet. Once the temperature at the temperature display reaches 120-180° C., the thermal door may be adjust to maintain that temperature. The design of the generator does not require modification for isothermal operation, as the generator has full cylinder cooling. A single can of VALVOLINE® Extra Strength Starting Fluid with cylinder lubricant contains sufficient diethyl ether to start the generator about 100 times. It may be desirable to use higher quality oil that resists thermal breakdown, such as AMSOIL® SAE 10W-40 synthetic motor oil as the lubricant, or change the lubricant more often, due to the high temperature operation of the engine. In addition it may be desirable to perform an engine flush treatment to remove carbon deposits from the heavy fuels.

In the case of such a modified portable gasoline generator, which has also been modified to receive a gaseous low-flashpoint fuel directly into the carburetor using a step-down regulator, it is possible to start the generator using only the gaseous low-flashpoint fuel. Once the temperature of 120-180° C. is reached, it is possible to switch the fuel supply to a heavy fuel, such as diesel fuel, from the primary fuel tank, which is using the gaseous low-flashpoint fuel as the starting fuel and using the heavy fuel as the running fuel. However, a much larger amount of gaseous low-flashpoint fuel is needed as compared to low-boiling point low-flashpoint fuel to sustain combustion, and the switch-over to the primary fuel tank must be carried out by the user.

Examples of portable flexible fuel generators of the present application are illustrated in the figures. The generator of the present invention includes an internal combustion engine containing a spark plug, a start module, full cylinder cooling and a thermal controller. Other parts are optional.

Figure 2:
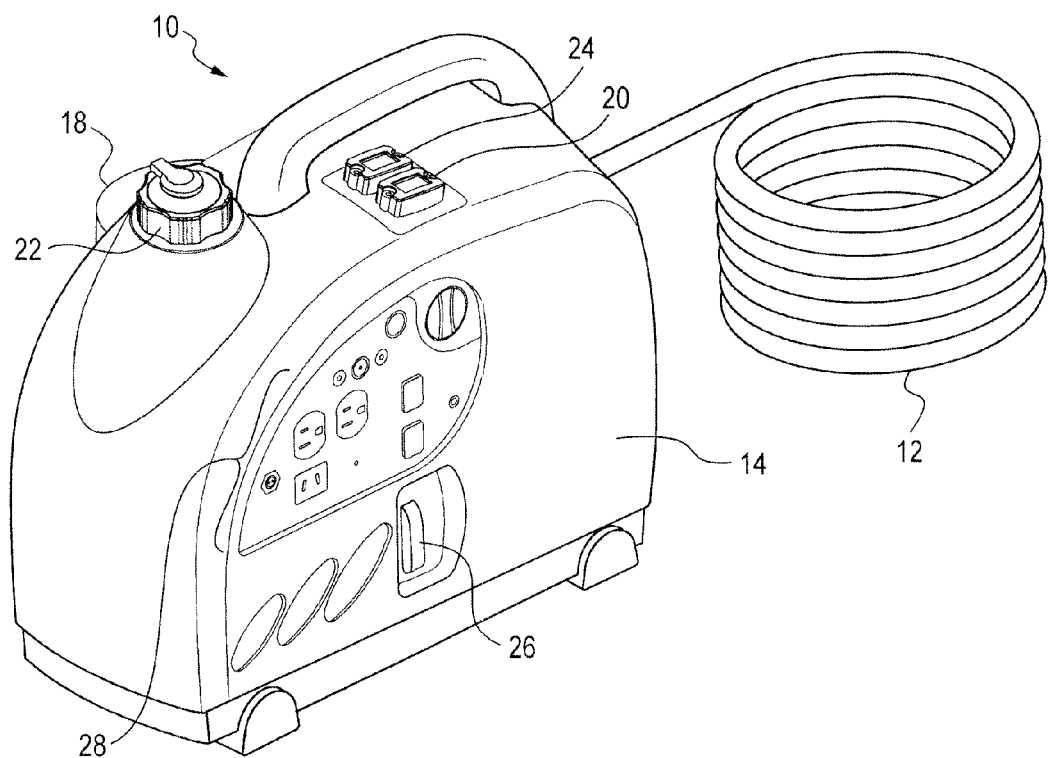

FIGS. 1 and 2 illustrate a flexible fuel generator, 10. The generator includes a generator housing, 14, which encloses the generator engine (not shown). Exhaust from the generator engine exits through an exhaust outlet (not shown) and then through an exhaust hose, 12, attached to the exhaust outlet. The generator housing includes a maintenance panel, 16, and a fueling port, 22. Attached to the maintenance door is a start module, 18. A temperature display, 20, on the generator housing displays the internal temperature of the generator engine. An auxiliary display, 24, displays other information, such as the length of time the generator has been operating. A pull start, 26, for manually starting the engine, passes through the generator housing. A control panel, 28, is present on the generator housing, and includes electrical plug receivers, start and stop buttons, and other controls for controlling the operation of the generator.

FIG. 3 illustrates a start module, 18. The start module is attached to the maintenance panel, 16. The start module includes a starting fuel enclosure, 30, which has a starting fuel button cover, 32, and a starting fuel button access, 34. Also illustrated are enclosure bolts, 36 and 36, which are used to attach the starting fuel enclosure to the maintenance panel.

FIG. 4 illustrates starting fuel enclosure, 30. The starting fuel enclosure, 30, has a starting fuel button cover, 32, and a starting fuel button access, 34. Also illustrated are enclosure bolt holes, 38 and 38, for the enclosure bolts.

Figure 5:
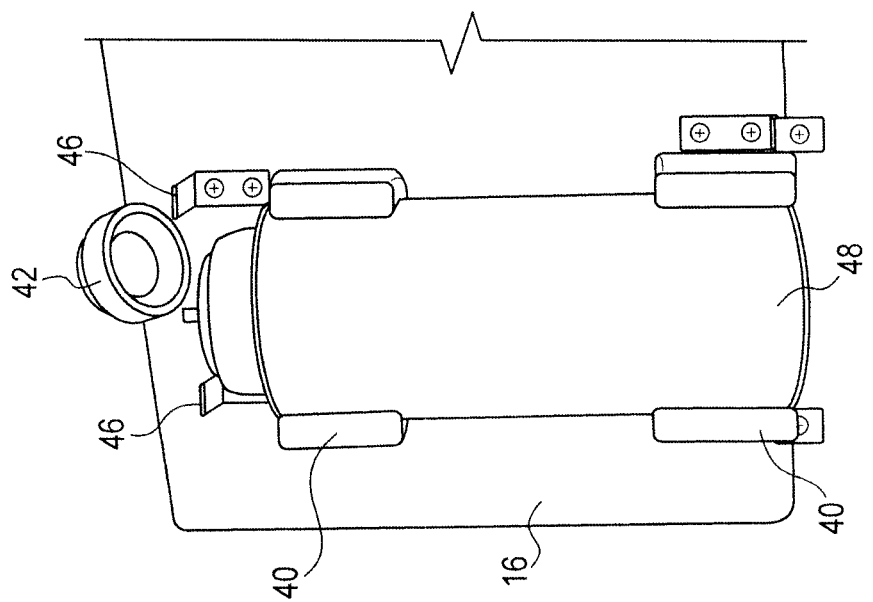

FIGS. 5 and 6 illustrate a start module with the starting fuel enclosure removed, with and without a starting fuel tank, respectively. Shown is the maintenance panel, 16. Attached to the panel are starting fuel tank holders, 40 and 40, for holding a starting fuel tank, 48. A starting fuel dispenser, 42, may be attached to the starting fuel tank, to dispense starting fuel. A starting fuel line, 44, attached to the starting fuel dispenser and passing through the maintenance panel, transports starting fuel to the air intake path of the generator. Also shown are enclosure bolt tabs, 46 and 46, attached to the maintenance panel, for receiving the enclosure bolts for attaching the starting fuel enclosure to the maintenance panel of the generator housing.

Figure 8:
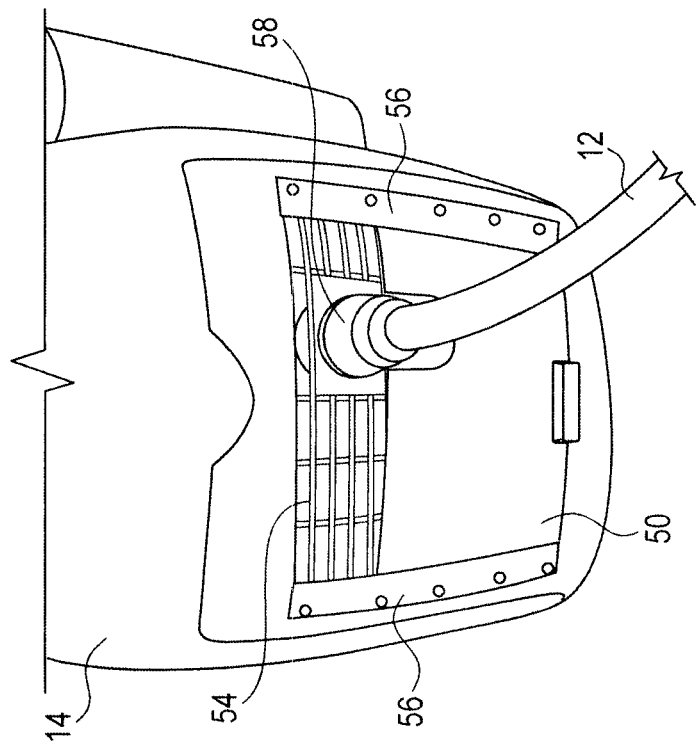
FIGS. 7 and 8 illustrate two configuration of the rear of a flexible fuel generator, providing details of the thermal controller.
Figure 7:
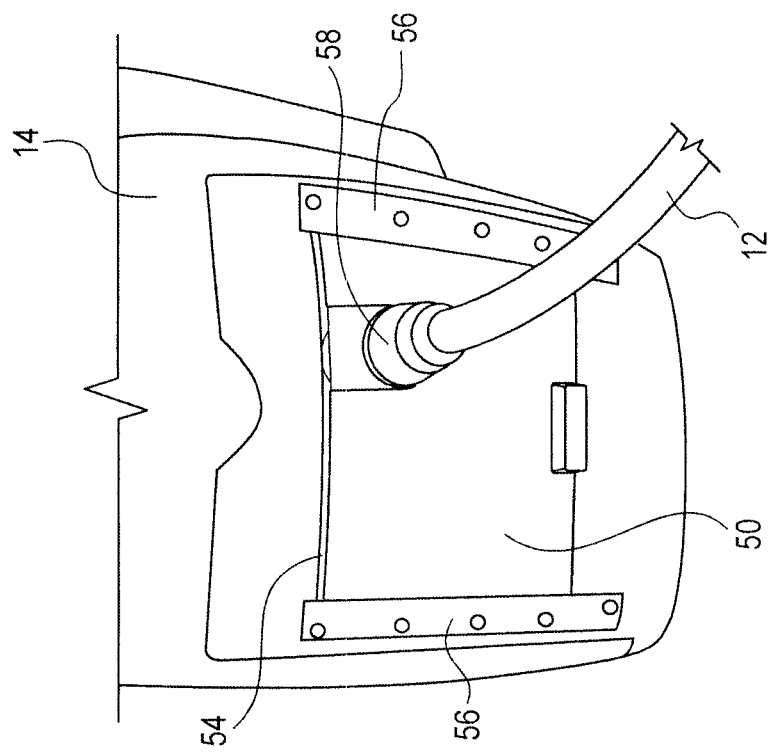

FIGS. 7 and 8 illustrate two configuration of the rear of a flexible fuel generator, providing details of the thermal door. Shown in these figures are the generator housing, 14, the exhaust port, 58, to which is attached the exhaust hose, 12. The thermal door, 50, is slideably attached to the rear of the generator housing by clasps, 56 and 56, over the cooling air outlet, 54. In FIG. 7, the thermal door almost completely blocks the cooling air outlet, while in FIG. 8, the thermal door blocks only a small portion of the cooling air outlet.

Figure 9:
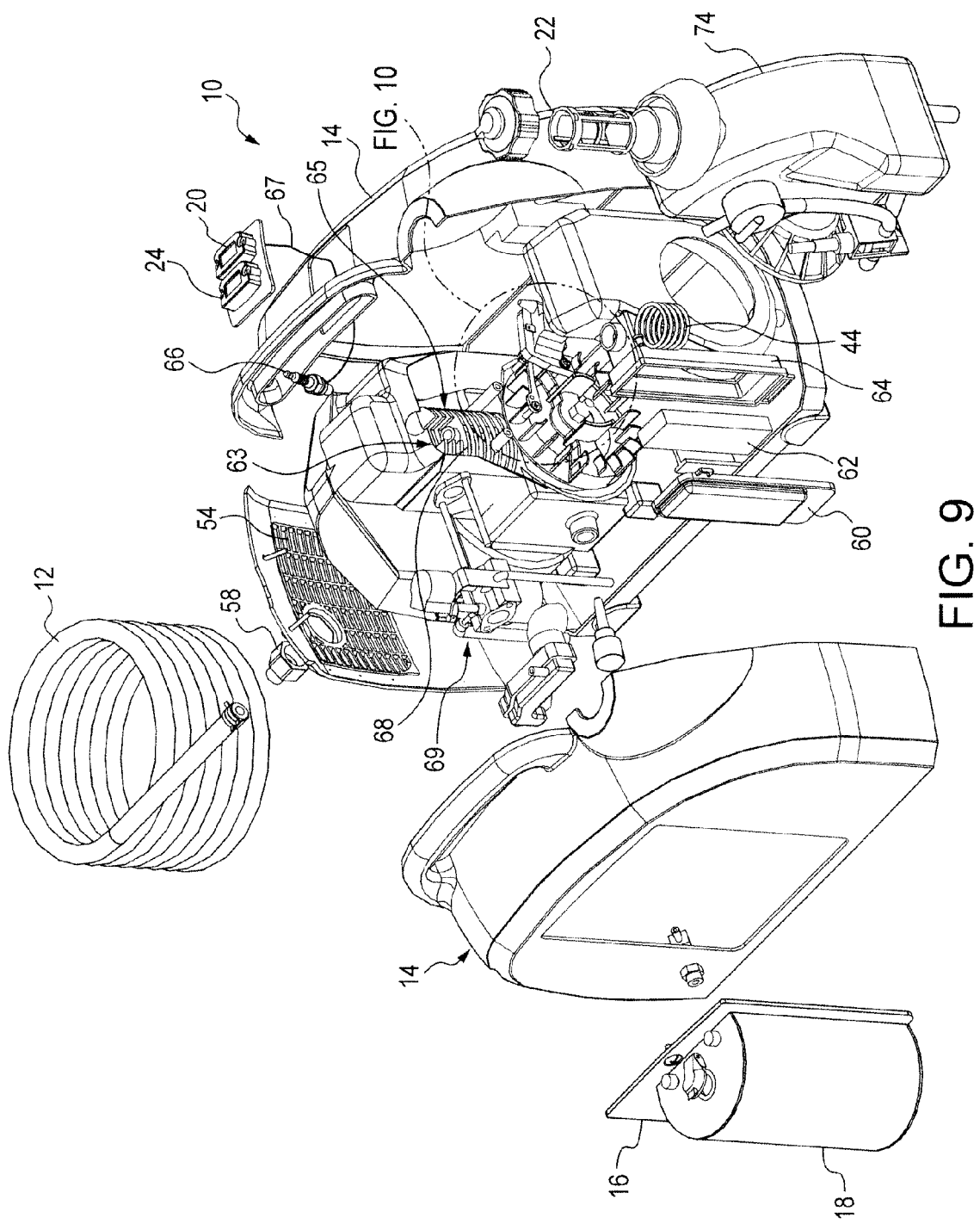
FIG. 9 is an exploded view of a flexible fuel generator.

FIG. 9 is an exploded view of a flexible fuel generator. Here, the generator housing, 14 has been split apart to show otherwise hidden elements. The air filter housing includes a front panel, 60 and a rear panel, 64, and the air filter, 62, is between these two panels; these elements are part of the air intake path. Air enters the generator and is pulled through a lower portion of the rear panel to a lower portion of the front panel, and then up along the front panel and through the air filter, and finally out the back of the upper portion of the rear panel. Also shown in the figure is starting fuel line, 44, which has an exit end delivering starting fuel to the back of the air filter (that is, the side of the air filter facing the rear panel). Although not illustrated in FIG. 9, the entrance end of the starting fuel line is attached to starting fuel dispenser, forming a fluid connection between the starting fuel tank and the air intake path. By activation of the starting fuel dispenser, for example by pressing the top of the starting fuel dispenser, starting fuel is dispensed onto the back of the air filter. Coolant (in this device, air) flows over the cylinder, 68, including portion of the cylinder at the fuel entrance, 63, and at the exhaust exit, 65. Also illustrated in FIG. 9 are the spark plug, 66, the temperature sensor, 67 (which measure the temperature at the spark plug and is connected to the temperature display), the carburetor, 69, and the primary fuel tank, 74.

Figure 10:
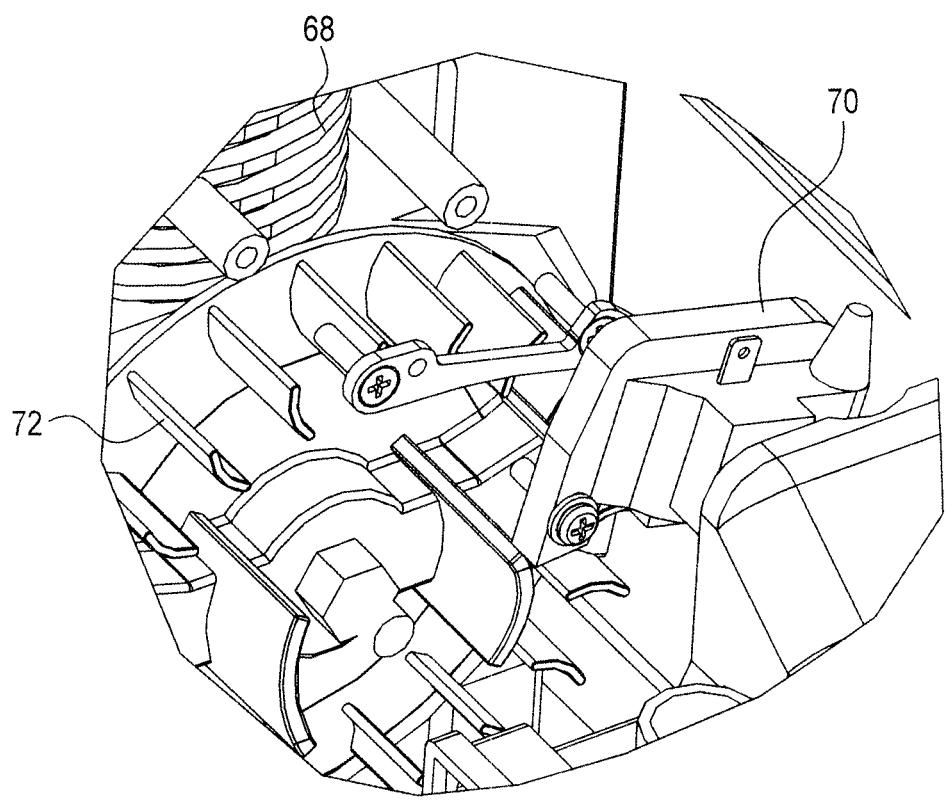
FIG. 10 illustrates a portion of the exploded view of the flexible fuel generator shown in FIG. 9.

FIG. 10 illustrates details of a portion of the exploded view of the flexible fuel generator shown in FIG. 9. Shown are the cylinder, 68, the air fan, 72, and the spark ignition coil, 70. The position of the spark ignition coil controls the timing of the spark plug, because it is coupled to movement of the drive shaft by magnets on the air fan (which is connected to the drive shaft); as the air fan rotates, the magnets actuate the spark ignition coil. Since the spark ignition coil is electrically connected to the spark plug, when the spark ignition coil is actuated, a spark is produced by the spark plug in the cylinder. Furthermore, the air fan pulls air through the generator and over the outside of the cylinder, to cool the cylinder, and then out the cooling air outlet. As is more clearly illustrated in FIG. 9, the outside of the cylinder includes cooling fins along the full length of the exterior, so that the cylinder is cooled at both the top and the bottom and therefore has full cylinder cooling.

EXAMPLE

A YAMAHA Inverter EF1000iS was modified to include a start module and thermal controller (a thermal door), as illustrated in the figures. Furthermore, a larger carburetor jet was used and the spark plug ignition timing was retarded.

What is claimed is:
1. A portable flexible fuel generator, having an engine, comprising:
   (1) a cylinder, and a spark plug in the cylinder,
   (2) a primary fuel tank, fluidly connected to the cylinder,
   (3) an air intake path, fluidly connecting atmosphere to the cylinder,
   (4) a start module, comprising a starting fuel tank holder and a starting fuel line, wherein the starting fuel line is fluidly connected to the air intake path,
   (5) a coolant path, which provides a flow path for coolant to cool the cylinder,
   (6) a thermal controller, along the coolant path,
   (7) a starting fuel tank, fluidly connected to the starting fuel line, and
   (8) a temperature sensor, measuring the temperature of the engine block,
   wherein the engine has full cylinder cooling, the starting fuel tank contains a low-boiling point low-flashpoint fuel, and the low-boiling point low-flashpoint fuel in the starting fuel tank is pressurized,
   the thermal controller is capable of controlling cooling of the engine so that the engine operates at a temperature of 120-180° C., and
   the primary fuel tank contains a heavy fuel.

2. The portable flexible fuel generator of claim 1, wherein the generator is air-cooled.

3. The portable flexible fuel generator of claim 1, wherein the portable gasoline generator has a compression ratio of 8.2:1, has fixed spark plug ignition timing, and has a 4 cycle, 50 cc engine.

4. The portable flexible fuel generator of claim 1, wherein the generator does not include a battery.

5. The portable flexible fuel generator of claim 1, wherein the cylinder comprises aluminum.

6. The portable flexible fuel generator of claim 1, further comprising a generator housing enclosing the cylinder, wherein the start module is attached to the generator housing.

7. The portable flexible fuel generator of claim 1, wherein an air filter is present along the air intake path, and
   the starting fuel line is connected to the air intake path between the air filter and the cylinder.

8. The portable flexible fuel generator of claim 1, wherein the coolant path has an entrance for air to enter the generator and an exit for air to exit the generator.

9. The portable flexible fuel generator of claim 1, wherein the thermal controller is a thermal door at the exit of the coolant path.

10. The portable flexible fuel generator of claim 1, wherein the start module further comprises a starting fuel enclosure comprising a starting fuel button access and starting fuel button cover.

11. The portable flexible fuel generator of claim 1, further comprising a starting fuel dispenser, fluidly connecting the starting fuel tank to the starting fuel line.

12. The portable flexible fuel generator of claim 1, wherein the low-boiling point low-flashpoint fuel is diethyl ether.

13. The portable flexible fuel generator of claim 1, wherein the heavy fuel comprises diesel fuel.

14. The portable flexible fuel generator of claim 13, wherein the diesel fuel is JP-8.

15. A method of generating electricity with a generator according to claim 1, the method comprising:
operating the engine in the isothermal range of 120-180° C., and
fueling the engine with a running fuel comprising the heavy fuel.

16. The method of claim 15, wherein the heavy fuel is diesel fuel.

17. The method of claim 16, wherein the diesel fuel is JP-8.

18. The method of claim 15, further comprising starting the engine while fueling the engine with the starting fuel comprising the low-boiling point low-flashpoint fuel.

19. The method of claim 18, wherein the starting fuel comprises a mixture of the low-boiling point low-flashpoint fuel and the heavy fuel.

20. The method of claim 18, wherein the low-boiling point low-flashpoint fuel comprises diethyl ether.

21. The method of claim 15, wherein the operating of the engine comprises operating the engine in the isothermal range of 150-170° C.

22. A method of making the portable flexible fuel generator according to claim 1, the method comprising modifying a portable gasoline generator,
wherein the modifying comprises:
adding the starting module comprising the starting fuel tank holder and the starting fuel line, wherein the starting fuel line is fluidly connected to the air intake path of the portable gasoline generator,
adding the thermal controller, wherein the thermal controller comprises a thermal door, along the coolant path of the portable gasoline generator, and
retarding the spark plug ignition timing.

23. The method of claim 22, wherein the portable gasoline generator has a compression ratio of 8.2:1, uses fixed spark plug ignition timing, has a 4 cycle, 50 cc engine, is air cooled, includes a pull start for starting the generator, and the cylinder comprises aluminum.

24. The method of claim 22, wherein the portable gasoline generator comprises a generator housing, and
the start module is attached to the generator housing.

25. The method of claim 22, wherein the start module further comprises a starting fuel enclosure comprising a starting fuel button access and starting fuel button cover.

26. The method of claim 22, wherein the portable gasoline generator comprises an air filter along the air intake path to supply air for combustion of fuel, and
the starting fuel line is connected to the air intake path between the air filter and the cylinder.

27. The method of claim 22, wherein air enters the generator via an entrance of the coolant path and exits via an exit of the coolant path, and
the thermal controller is a thermal door at the exit of the coolant path.

28. The method of claim 22, wherein the modifying further comprises adding a starting fuel tank, fluidly connected to the starting fuel line, and
the starting fuel tank contains pressurized diethyl ether.

29. The method of claim 22, wherein:
the portable gasoline generator has a compression ratio of 8.2:1, uses fixed timing, and has a 4 cycle, 50 cc engine, and
the portable gasoline generator comprises:
a generator housing,
an air filter along the intake path supplying air for combustion of fuel,
the coolant path having an entrance for air to enter the generator and an exit for air to exit the generator,
wherein the start module is attached to the generator housing,
the start module further comprises a starting fuel enclosure,
the starting fuel enclosure comprises a starting fuel button access and starting fuel button cover,
the starting fuel line is connected to the air intake path between the air filter and the cylinder, and
the thermal controller comprises a thermal door at the exit of the coolant path.

30. The portable flexible fuel generator of claim 1, further comprising:
a generator housing enclosing the cylinder, wherein the start module is attached to the generator housing, and
a starting fuel dispenser, fluidly connecting the starting fuel tank to the starting fuel line,
wherein an air filter is present along the air intake path,
the starting fuel line is connected to the air intake path between the air filter and the cylinder,
the coolant path has an entrance for air to enter the generator and an exit for air to exit the generator
the thermal controller is a thermal door at the exit of the coolant path, and
the start module further comprises a starting fuel enclosure comprising a starting fuel button access and starting fuel button cover.

31. The portable flexible fuel generator of claim 30, wherein the starting fuel line has an exit end which delivers starting fuel onto the air filter.

* * * * *